(12) United States Patent
Sano et al.

(10) Patent No.: US 7,719,235 B2
(45) Date of Patent: May 18, 2010

(54) CHARGE/DISCHARGE PROTECTION CIRCUIT AND POWER-SUPPLY UNIT

(75) Inventors: Kazuaki Sano, Chiba (JP); Atsushi Sakurai, Chiba (JP); Toshiyuki Koike, Chiba (JP)

(73) Assignee: Seiko Instruments Inc., Chiba (JP)

( * ) Notice: Subject to any disclaimer, the term of this patent is extended or adjusted under 35 U.S.C. 154(b) by 268 days.

(21) Appl. No.: 11/709,104

(22) Filed: Feb. 20, 2007

(65) Prior Publication Data

US 2007/0210759 A1    Sep. 13, 2007

(30) Foreign Application Priority Data

Feb. 23, 2006    (JP) ............................. 2006-046885

(51) Int. Cl.
    *H02J 7/00*    (2006.01)
(52) U.S. Cl. ..................... 320/136; 320/128; 320/163
(58) Field of Classification Search ................. 320/128, 320/134, 136, 162, 163
    See application file for complete search history.

(56) References Cited

U.S. PATENT DOCUMENTS 5,733,674 A * 3/1998 Law et al. .................. 429/9

| 5,789,900 A | 8/1998 | Hasegawa et al. | |
|---|---|---|---|
| 6,340,880 B1 * | 1/2002 | Higashijima et al. | 320/162 |
| 6,590,440 B1 | 7/2003 | Williams et al. | |
| 6,624,614 B2 | 9/2003 | Mashiko | |

FOREIGN PATENT DOCUMENTS

| JP | 08-196042 A | 7/1996 |
|---|---|---|
| JP | 2001-251772 A | 9/2001 |
| JP | 2002-325364 A | 11/2002 |
| JP | 2005-137196 A | 5/2005 |

* cited by examiner

*Primary Examiner*—Edward Tso
*Assistant Examiner*—Aaron Piggush
(74) *Attorney, Agent, or Firm*—Brinks Hofer Gilson & Lione

(57) ABSTRACT

Provided is a charge/discharge protection circuit, which has a simple circuit configuration using a double-throw semiconductor switching device and is capable of recovering from a state where charging/discharging is inhibited with the double-throw semiconductor switching device being turned off. The charge/discharge protection circuit includes a charge/discharge control circuit which is provided with a second terminal for detecting which one of a charger and a load is connected to an external terminal. The second terminal has a first resistor and a first switch connected in series between a power source, and has a second resistor and a second switch connected in series between a ground.

10 Claims, 3 Drawing Sheets

CHARGE/DISCHARGE PROTECTION CIRCUIT AND POWER-SUPPLY UNIT

This application claims priority under 35 U.S.C. §119 to Japanese Patent Application No. JP2006-046885 filed Feb. 23, 2006, the entire content of which is hereby incorporated by reference.

BACKGROUND OF THE INVENTION

1. Field of the Invention

The present invention relates to a charge/discharge protection circuit for controlling charging/discharging of a secondary battery.

2. Description of the Related Art

In recent years, a secondary battery has widely been used along with developments of downsized portable electronic devices. One of the most-widely-used secondary batteries includes a lithium secondary battery. However, there have been pointed out many problems regarding the lithium secondary battery in that overcharging or overdischarging causes damage, degradation, and the like in the battery, thereby shortening the service life of the battery.

In order to solve those problems, various charge/discharge protection circuits have been developed. Most of those charge/discharge protection circuits have a circuit configuration in which two MOSFETs connected in series are provided as a charge/discharge control switching device in a charge/discharge path, in which a control circuit using a battery voltage as a power source controls the gate voltages of the two MOSFETs to thereby inhibit charging or discharging.

FIG. 5 shows a conventional charge/discharge protection circuit having the above-mentioned configuration (see JP 2872365 B). Specifically, a charge/discharge control circuit 5 turns off a charging control MOSFET 18 through a charging control terminal 23 upon detecting that a battery voltage of the secondary battery 12 is increased to be equal to or larger than a preset voltage, to thereby shut off a charging current. During when the charging current is shut off, a discharging current flows through a parasitic diode of the charging control MOSFET 18.

Similarly, the charge/discharge control circuit 5 turns off a discharging control MOSFET 19 through a discharging control terminal 24 upon detecting that a battery voltage of the secondary battery 12 is decreased to be equal to or smaller than a preset voltage, to thereby shut off a discharging current. During when the discharging current is shut off, a charging current flows through a parasitic diode of the discharging control MOSFET 19.

According to the above-mentioned circuit configuration, it is necessary to externally provide two MOSFETs to the charge/discharge control circuit 5, which increases the size of the charge/discharge protection circuit. Therefore, the circuit configuration described above has a problem in terms of cost and saving space in footprint required in portable equipment.

Further, there has also been another problem in that the device itself is easy to be degraded because the circuit has a mode in which a charging/discharging current flows through the parasitic diode of the MOSFET.

In order to solve those problems, there has been proposed another charge/discharge protection circuit in which only a single charge/discharge control switching device is employed and a charge/discharge current does not flow through a parasitic diode.

FIG. 6 shows a conventional example of a charge/discharge protection circuit in which a double-throw semiconductor switching device is provided to a charge/discharge path. The double-throw semiconductor switching device is a single device having no parasitic diode and has a double-throw characteristic (see JP 2001-251772 A).

Specifically, the double-throw semiconductor switching device 1 has the drain connected to the secondary battery 12, the source connected to a load/charger 4, and the gate connected to the charge/discharge control circuit 5. The charge/discharge control circuit 5 turns on and off the double-throw semiconductor switching device 1 in accordance with the terminal voltage of the secondary battery 12.

The above-mentioned circuit merely includes the double-throw semiconductor switching device 1 as the charge/discharge switching device, thereby realizing a simpler circuit configuration. In addition, the double-throw semiconductor switching device 1 shuts off currents in both directions when turned off, and therefore the circuit does not have a mode in which a current flows through a parasitic diode, which less likely to cause degradation in the device itself.

However, according to the conventional charge/discharge protection circuit using the double-throw semiconductor switching device, the charge/discharge control circuit 5 cannot detect which one of a load and a charger is connected to the charge/discharge protection circuit. Therefore, there has been a problem in that, once the double-throw semiconductor switching device is turned off in order to shut off a charging current, it is impossible to cause a discharging current to flow even when a load is connected by replacing the charger which has been removed from the charge/discharge protection circuit. There has also been a similar problem in that, once the double-throw semiconductor switching device is turned off in order to shut off a discharging current, it is impossible to get charging started even when a charger is connected to the charge/discharge protection circuit.

In addition, according to the above-mentioned conventional example, in a case where an excessive charging current or an excessive discharging current which may lead to a breakdown of the double-throw semiconductor switching device flows through the charge/discharge path, the charge/discharge control circuit does not have a function of detecting the current and shutting off the excessive current. Therefore, the circuit has a problem in terms of reliability.

Further, according to the above-mentioned conventional example, it is assumed that the double-throw semiconductor switching device is provided as a field effect transistor having a normally-on characteristic. According to the normally-on characteristic, the switch remains on even when no voltage is applied to the gate thereof. Due to the characteristic, in a case where the connection between the control circuit and the gate of the semiconductor switching device is cut off due to an unexpected event, charging or discharging is allowed, resulting in continuation of charging or discharging which may lead to destruction or degradation of the secondary battery. Therefore, the circuit has a problem in terms of protection of the secondary battery.

SUMMARY OF THE INVENTION

In view of the above-mentioned circumstances, it is an object of the present invention to provide an easy-to-use charge/discharge protection circuit of a simple circuit configuration at low cost with high reliability.

In order to attain an above-mentioned object, the present invention provides a charge/discharge circuit including a double-throw semiconductor switching device which is a single switch provided to a charge/discharge path and has a double-throw characteristic, and a charge/discharge control circuit for performing on/off control of the double-throw semiconductor switching device, in which the charge/discharge control circuit includes a first terminal for controlling the double-throw semiconductor switching device and a second terminal for detecting which one of a charger and a load is connected to an external terminal.

Also, in the charge/discharge protection circuit according to the present invention, the charge/discharge control circuit further includes a third terminal being connected to a potential for turning off the double-throw semiconductor switching device through a resistor, the third terminal being connected to the gate of the double-throw semiconductor switching device.

According to the charge/discharge control circuit according to the present invention, it is possible to provide an easy-to-use charge/discharge protection circuit of a simple circuit configuration using a single switching device at low cost with high reliability.

DETAILED DESCRIPTION OF THE PREFERRED EMBODIMENTS

Embodiment 1

Figure 1:
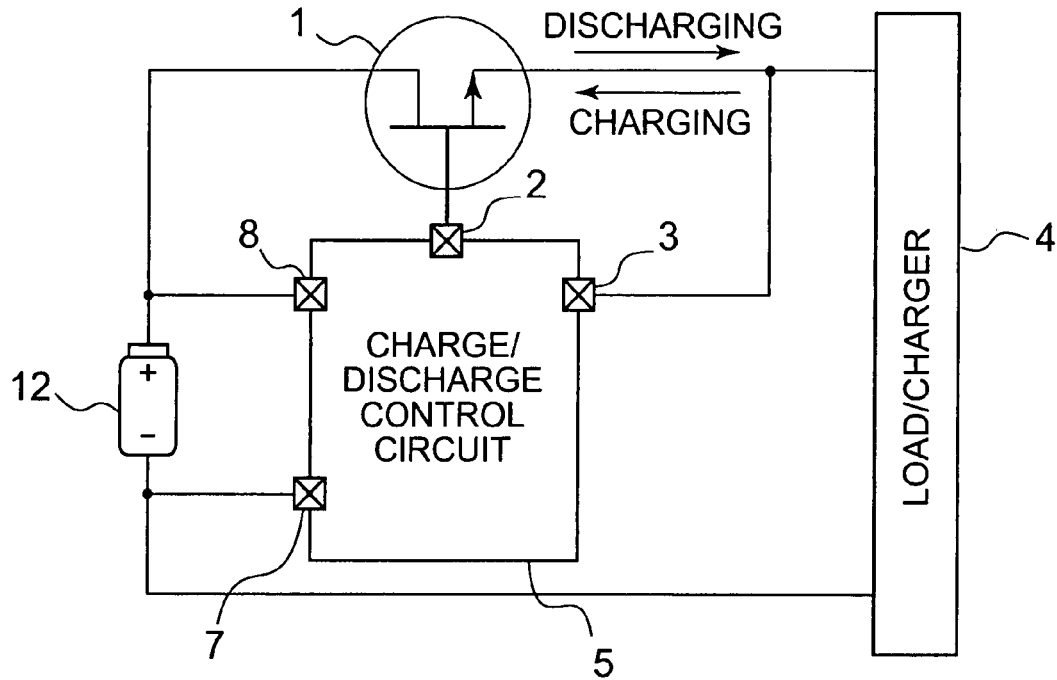
FIG. 1 is a block diagram of a charge/discharge protection circuit according to a first embodiment of the present invention.

FIG. 1 shows a charge/discharge protection circuit according to a first embodiment of the present invention. A charge/discharge control circuit 5 includes a VDD terminal 8 connected to a positive electrode of a secondary battery 12, a VSS terminal 7 connected to a negative electrode of the secondary battery 12, a first terminal 2, and a second terminal 3. The charge/discharge control circuit 5 is capable of detecting a voltage across the VDD terminal 8 and the VSS terminal 7 and a voltage across the second terminal 3 and the VSS terminal 7. A double-throw semiconductor switching device 1 has the drain connected to the positive electrode of the second battery 12 and to the VDD terminal 8 of the charge/discharge control circuit 5, the source connected to the second terminal 3 of the charge/discharge control circuit 5 and to a load/charger 4, and the gate connected to the first terminal 2 of the charge/discharge control circuit 5.

First, a description is given on a case where a charger is connected in the position of the load/charger 4. In this case, a charging current flows through a charge/discharge path. When a voltage of the secondary battery 12 is increased due to the charging current so as to increase a voltage across the VDD terminal 8 and the VSS terminal 7 of the charge/discharge control circuit 5 to be equal to or larger than a preset voltage at which charging should be inhibited, the charge/discharge control circuit 5 shuts off the charging current by controlling the gate of the double-throw semiconductor switching device 1 through the first terminal 2. After the charging current is shut off, the voltage across the second terminal 3 and the VSS terminal 7 of the charge/discharge control circuit 5 becomes to be equal to the voltage of the charger.

After that, the charger is taken off from the charge/discharge path, and a load is connected in the place of the load/charger 4. At this time, the voltage across the second terminal 3 and the VSS terminal 7 of the charge/discharge circuit 5 falls to be equal to zero because no power is supplied to the load. Because of this, the charge/discharge control circuit 5 detects that the load is connected, and turns on the double-throw semiconductor switching device 1 through the first terminal 2.

Next, a description is given on a case where the load is connected in the position of the load/charger 4. In this case, a discharging current flows through the charge/discharge path. When a voltage of the secondary battery 12 is decreased due to the discharging current so as to decrease a voltage across the VDD terminal 8 and the VSS terminal 7 of the charge/discharge control circuit 5 to be equal to or smaller than a preset voltage at which discharging should be inhibited, the charge/discharge control circuit 5 shuts off the discharging current by controlling the gate of the double-throw semiconductor switching device 1 through the first terminal 2. After the discharging current is shut off, the voltage across the second terminal 3 and the VSS terminal 7 of the charge/discharge control circuit 5 becomes equal to zero.

After that, the load is taken off from the charge/discharge path, and the charger is connected in the place of the load/charger 4. At this time, the voltage across the second terminal 3 and the VSS terminal 7 of the charge/discharge control circuit 5 increases to be equal to that of the voltage of the charger. Because of this, the charge/discharge control circuit 5 detects that the charger is connected, and turns on the double-throw semiconductor switching device 1 through the first terminal 2.

Figure 2:
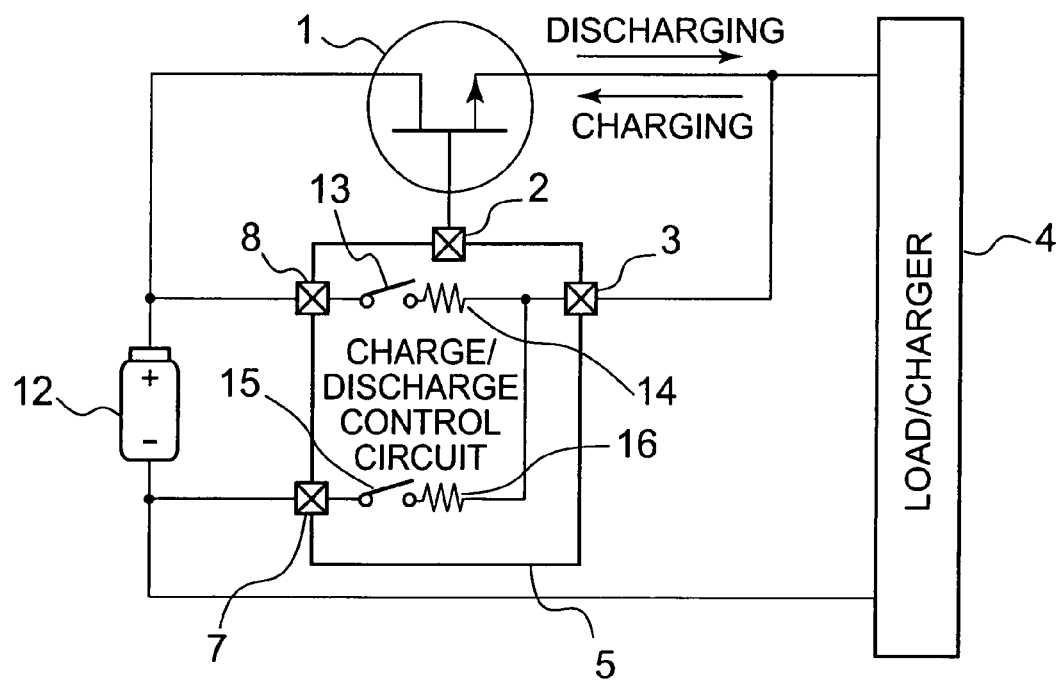
FIG. 2 is a block diagram of the charge/discharge protection circuit according to the first embodiment of the present invention.

FIG. 2 shows a specific example of the charge/discharge protection circuit according to the first embodiment of the present invention. In the charge/discharge control circuit 5, a pull-up resistor 14 and a pull-up switch 13 are connected in series between the second terminal 3 and the VDD terminal 8, and a pull-down resistor 16 and a pull-down switch 15 are connected in series between the second terminal 3 and the VSS terminal 7.

In the normal charging/discharging state, the charge/discharge control circuit 5 performs control to turn on the double-throw semiconductor switching device 1 and to turn off both the pull-up switch 13 and the pull-down switch 15.

First, a description is given on a case where an excessive discharging current flows through the charge/discharge path. When a normal discharging current is flowing through the charge/discharge path, the voltage across the VDD terminal 8 and the VSS terminal 7 of the charge/discharge control circuit 5 is substantially the same as the voltage across the second terminal 3 and the VSS terminal 7 of the charge/discharge control circuit 5. For example, a discharging current is obtained as 3 mA when the voltage of the secondary battery 12 is 3 V, a load connected in the position of the load/charger 4 is 1 kΩ, and an on resistance of the double-throw semiconductor switching device 1 is 20 mΩ. Accordingly, a drop in voltage due to the on resistance of the double-throw semiconductor switching device 1 and the discharging current is obtained as 0.06 mV by multiplying 20 mΩ by 3 mA (20 mΩ×3 mA=0.06 mV). Accordingly, the voltage across the VDD terminal 8 and the VSS terminal 7 of the charge/discharge circuit 5 is 3 V, and the voltage across the second terminal 3 and the VSS terminal 7 is obtained as 2.99994 V, which is nearly equal to 3V, by subtracting 0.06 mV from 3 V (3 V−0.06 mV=2.99994 V≈3 V).

In this case, when the load is decreased to 1Ω, an excessive discharging current of approximately 3 A flows through the charge/discharge path. When the double-throw semiconductor switching device 1 cannot withstand a current of 3 A, the double-throw semiconductor switching device 1 may be destructed by the discharging current. In order to protect the double-throw semiconductor switching device 1, it is necessary for the charge/discharge control circuit 5 to control the first terminal 2 so as to turn off the double-throw semiconductor switching device 1, to thereby shut off the discharging current.

A drop in voltage due to the on resistance of the double-throw semiconductor switching device 1 and the discharging current of 3 A is obtained as 60 mV by multiplying 20 mΩ by 3 A (20 mΩ×3 A=60 mV). Accordingly, the voltage across the VDD terminal 8 and the VSS terminal 7 of the charge/discharge control circuit 5 is 3 V, and the voltage across the second terminal 3 and the VSS terminal 7 is obtained as 2.94 V by subtracting 0.06 V from 3 V (3 V−0.06 V=2.94 V). This voltage difference increases as the discharging current becomes larger.

When a voltage difference obtained by subtracting the voltage value across the second terminal 3 and the VSS terminal 7 from the voltage value across the VDD terminal 8 and the VSS terminal 7 increases to be equal to or larger than a preset value, the charge/discharge control circuit 5 determines that an excessive discharging current is flowing through the charge/discharge path and turns off the double-throw semiconductor switching device 1 through the first terminal 2, to thereby shut off the discharging current. Further, the charge/discharge control circuit 5 controls the pull-up switch 13 provided therein so as to turn on the pull-up switch 13. When the pull-up switch 13 is turned on, the VDD terminal 8 and the second terminal 3 of the charge/discharge control circuit 5 are connected to each other within the control circuit through the pull-up resistor 14. At this time, the voltage across the second terminal 3 and the VSS terminal 7 of the charge/discharge control circuit 5 is obtained as 0.03 mV, which is nearly equal to 0 V, when the voltage of the secondary battery 12 is 3 V, a load connected in the position of the load/charger 4 is 1Ω, and a resistance value of the pull-up resistor 14 is 100 kΩ, by dividing the resistance of 1 Ω by 100 kΩ and multiplying the resultant by 3 V ((1 Ω/100 kΩ)×3 V=0.03 V≈0 V).

After that, when the load of 1Ω is taken off, no current flows through the pull-up resistor 14. Accordingly, the voltage across the second terminal 3 and the VSS terminal 7 of the charge/discharge control circuit 5 becomes equal to the voltage of the secondary battery 12. The charge/discharge control circuit 5 detects the change in voltage, and turns on the double-throw semiconductor switching device 1 through the first terminal 2. At the same time, the pull-up switch 13 is controlled to be turned off.

Next, a description is given on a case where an excessive charging current flows through the charge/discharge path. When a normal charging current is flowing through the charge/discharge path, the voltage across the VDD terminal 8 and the VSS terminal 7 of the charge/discharge control circuit 5 are substantially the same as the voltage across the second terminal 3 and the VSS terminal 7 of the charge/discharge control circuit 5. For example, a drop in voltage due to the on resistance of the double-throw semiconductor switching device 1 and the charging current is obtained as 20 mV, when a voltage of the secondary battery 12 is 3 V, a current flowing through the charger connected in the position of the load/charger 4 is 1 A, and the on resistance of the double-throw semiconductor switching device is 20 mΩ, by multiplying 20 mΩ by 1 A (20 mΩ×1 A=20 mV). Accordingly, the voltage across the VDD terminal 8 and the VSS terminal 7 of the charge/discharge control circuit 5 is obtained as 3.02 V by adding 20 mV to 3 V (3 V+20 mV=3.02 V), and the voltage across the second terminal 3 and the VSS terminal 7 is obtained as 3 V.

When the charging current increases, for example, to 3 A, the double-throw semiconductor switching device 1 may be destructed by the charging current if the double-throw semiconductor switching device 1 cannot withstand a current of 3 A. In order to protect the double-throw semiconductor switching device 1, it is necessary for the charge/discharge control circuit 5 to control the first terminal 2 so as to turn off the double-throw semiconductor switching device 1, to thereby shut off the charging current.

A drop in voltage due to the on resistance of 20 mΩ of the double-throw semiconductor switching device 1 and the charging current of 3 A is obtained as 60 mV by multiplying 20 mΩ by 3 A (20 mΩ×3 A=60 mV). Accordingly, the voltage across the VDD terminal 8 and the VSS terminal 7 of the charge/discharge control circuit 5 is obtained as 3.06 V by adding 60 mV to 3V (3 V+60 mV=3.06 V), and the voltage across the second terminal 3 and the VSS terminal 7 is obtained as 3 V. This voltage difference increases as the charging current becomes larger.

When a voltage difference obtained by subtracting the voltage value across the VDD terminal 8 and the VSS terminal 7 from the voltage value across the second terminal 3 and the VSS terminal 7 increases to be equal to or larger than a preset value, the charge/discharge control circuit 5 determines that an excessive charging current is flowing through the charge/discharge path and turns off the double-throw semiconductor switching device 1 through the first terminal 2, to thereby shut off the charging current. Further, the charge/discharge control circuit 5 controls the pull-down switch 15 provided therein so as to turn on the pull-down switch 15. When the pull-down switch 15 is turned on, the VSS terminal 7 and the second terminal 3 of the charge/discharge control circuit 5 are connected to each other within the control circuit through the pull-down resistor 16. At this time, the voltage across the second terminal 3 and the VSS terminal 7 of the charge/discharge circuit 5 is obtained as 5 V when a charger connected in the position of the load/charger 4 has 5 V.

After that, when the charger is taken off, the potential of the second terminal 3 of the charge/discharge control circuit 5 becomes equal to the potential of the VSS terminal 7. Accordingly, the voltage across the second terminal 3 and the VSS terminal 7 decreases to be 0 V. The charge/discharge control circuit 5 detects the change in voltage, and turns on the double-throw semiconductor switching device 1 through the first terminal 2. At the same time, the pull-down switch 15 is controlled to be turned off.

As described above, the second terminal 3 is provided to the charge/discharge control circuit 5 so as to detect the voltage of a load or a charger. Accordingly, it is possible to control charging/discharging by automatically detecting connection of a load or charger, even when the secondary battery and the load or charger are disconnected from each other through the double-throw semiconductor switching device 1. Therefore, it is possible to provide an easy-to use charge/discharge protection circuit at low cost with high reliability.

Figure 3:
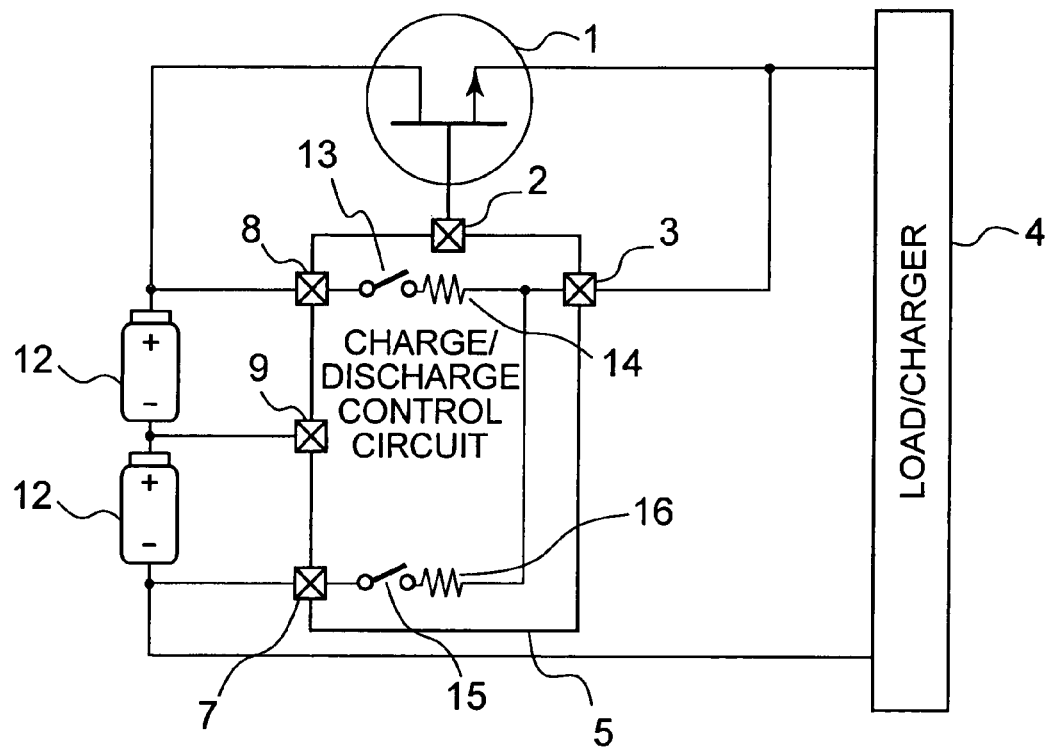
FIG. 3 is a block diagram of the charge/discharge protection circuit according to the first embodiment of the present invention.

Also, as shown in FIG. 3, in the power-supply unit in which a plurality of secondary batteries are connected in series, the charge/discharge control circuit is capable of detecting each of the states of the plurality of secondary batteries by detecting a potential of a median point of two of the secondary batteries. Therefore, it is possible to obtain the similar effect as described above.

Embodiment 2

Figure 4:
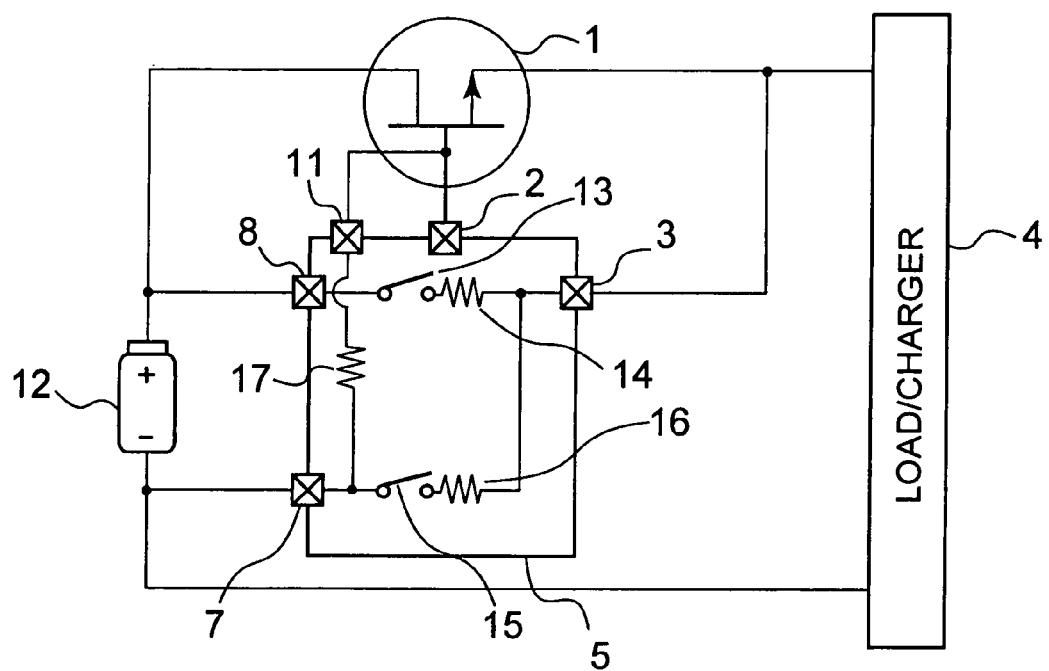
FIG. 4 is a block diagram of a charge/discharge protection circuit according to a second embodiment of the present invention.
Figure 5:
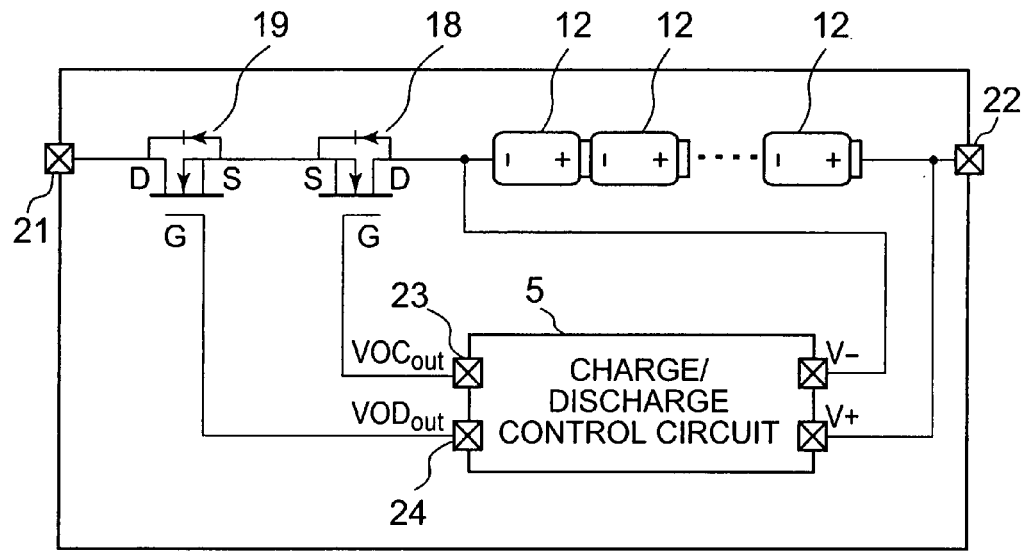
FIG. 5 is a block diagram of a charge/discharge protection circuit according to a conventional example.
Figure 6:
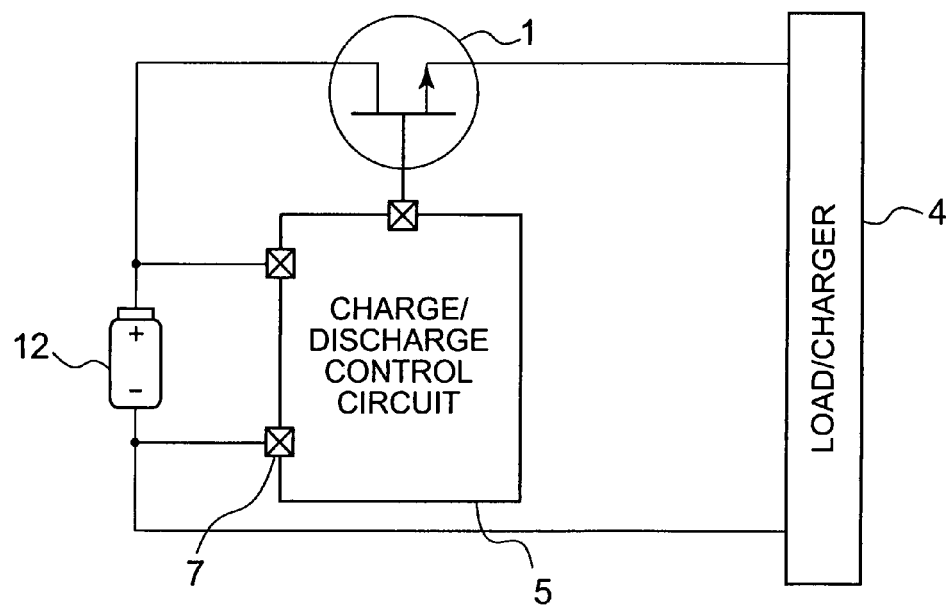
FIG. 6 is a block diagram of the charge/discharge protection circuit according to another conventional example.

FIG. 4 shows a charge/discharge protection circuit according to a second embodiment of the present invention, which is different from the one of FIG. 2 in that the charge/discharge control circuit 5 includes a third terminal 11 connected to the gate of the double-throw semiconductor switching device 1. The third terminal 11 is connected to the VSS terminal 7 through the pull-down resistor 17.

The double-throw semiconductor switching device 1 has a normally-on characteristic, that is, the double-throw semiconductor switching device 1 turns on when the potential of the gate thereof is indefinite. In order to turn off the double-throw semiconductor switching device 1, it is necessary to apply the gate with a potential that is lower than the potential of the source. Even when the connection between the first terminal 2 and the gate of the double-throw semiconductor switching device 1 is cut off for some reason, the gate of the double-throw semiconductor switching device 1 is controlled to be turned off through the pull-down resistor 17, which shuts off both charging and discharging. Therefore, it is possible to protect the secondary battery 12 and the double-throw semiconductor switching device 1 from deterioration or breakdown.

As described above, a description has been given on embodiments of the present invention in which the double-throw semiconductor switching device 1 is used as a high-side switch. It is also possible to construct a charge/discharge protection circuit in which the double-throw semiconductor switching device 1 is used as a low-side switch.

What is claimed is:

1. A charge/discharge protection circuit, comprising:
   a double-throw semiconductor switching device provided between an external terminal and a secondary battery; and
   a charge/discharge control circuit for controlling charging/discharging of the secondary battery by monitoring a voltage of the secondary battery and turning on and off the double-throw semiconductor switching device, wherein
   the charge/discharge control circuit comprises:
      a first terminal connected to the double-throw semiconductor switching device;
      a second terminal for detecting which one of a charger and a load is connected to the external terminal;
      a VDD terminal connected a positive electrode of the secondary battery;
      a first resistor and a first switch connected in series between the VDD terminal and the second terminal; and
      a second resistor and a second switch connected in series between a ground terminal of the charge/discharge control circuit and the second terminal,
   wherein the charge/discharge control circuit, when detecting an overcurrent at the external terminal based on a voltage of the second terminal in a charging state, is configured to monitor a voltage of the second terminal by turning off the double-throw semiconductor switching device and turning on the first switch through an output of the first terminal,
   wherein the charge/discharge control circuit, when detecting an overcurrent at the external terminal based on a voltage of the second terminal in a discharging state, is further configured to monitor a voltage of the second terminal by turning off the double-throw semiconductor switching device and turning on the second switch through an output of the first terminal, and
   wherein the charge/discharge control circuit is configured to turn off the double-throw semiconductor when a difference of a voltage across the second terminal and the ground terminal minus a voltage across the VDD terminal and the ground terminal is greater than or equal to a first preset value.

2. The charge/discharge protection circuit according to claim 1, wherein the charge/discharge control circuit further comprises a third terminal being connected to a potential for turning off the double-throw semiconductor switching device through a resistor, the third terminal being connected to a gate of the double-throw semiconductor switching device.

3. A power-supply unit, comprising:
   a secondary battery; and
   the charge/discharge protection circuit according to claim 1.

4. The charge/discharge protection circuit according to claim 1, wherein the charge/discharge control circuit is further configured to turn on the second switch when the difference of the voltage across the second terminal and the ground terminal minus the voltage across the VDD terminal and the ground terminal is greater than or equal to the first preset value.

5. The charge/discharge protection circuit according to claim 1, wherein the charge/discharge control circuit is further configured to turn off the double-throw semiconductor when a difference between the voltage across the VDD terminal and the ground terminal minus the voltage across the second terminal and the ground terminal is greater than or equal to a second preset value.

6. The charge/discharge protection circuit according to claim 5, wherein the charge/discharge control circuit is further configured to turn on the first switch when a difference between the voltage across the VDD terminal and the ground terminal minus the voltage across the second terminal and the ground terminal is greater than or equal to a second preset value.

7. A charge/discharge protection circuit, comprising:
   a double-throw semiconductor switching device provided between an external terminal and at least one battery; and
   a charge/discharge control circuit for controlling charging/discharging of the at least one battery by monitoring a voltage of the at least one battery and turning on and off the double-throw semiconductor switching device, wherein
   the charge/discharge control circuit comprises:
      a first terminal connected to the double-throw semiconductor switching device;
      a second terminal for detecting which one of a charger and a load is connected to the external terminal;
      a VDD terminal connected a positive electrode of the at least one battery;
      a ground terminal;
      a first resistor and a first switch connected in series between the VDD terminal and the second terminal; and a second resistor and a second switch connected in series between the ground terminal and the second terminal, wherein the charge/discharge control circuit, when detecting an overcurrent at the external terminal based on a voltage of the second terminal in a charging state, is configured to monitor a voltage of the second terminal by turning off the double-throw semiconductor switching device and turning on the first switch through an output of the first terminal, wherein the charge/discharge control circuit, when detecting an overcurrent at the external terminal based on a voltage of the second terminal in a discharging state, is further configured to monitor a voltage of the second terminal by turning off the double-throw semiconductor switching device and turning on the second switch through an output of the first terminal, and wherein the charge/discharge control circuit is configured to turn off the double-throw semiconductor when a difference between the voltage across the VDD terminal and the ground terminal minus the voltage across the second terminal and the ground terminal is greater than or equal to a first preset value.

8. The charge/discharge protection circuit according to claim 7, wherein the charge/discharge control circuit is further configured to turn on the first switch when a difference between the voltage across the VDD terminal and the ground terminal minus the voltage across the second terminal and the ground terminal is greater than or equal to the first preset value.

9. The charge/discharge protection circuit according to claim 7, wherein the charge/discharge control circuit is configured to turn off the double-throw semiconductor when a difference of the voltage across the second terminal and the ground terminal minus the voltage across the VDD terminal and the ground terminal is greater than or equal to a second preset value.

10. The charge/discharge protection circuit according to claim 9, wherein the charge/discharge control circuit is further configured to turn on a second switch when the difference of the voltage across the second terminal and the ground terminal minus the voltage across the VDD terminal and the ground terminal is greater than or equal to the second preset value, wherein the second switch is connected between the ground terminal end the second terminal.

* * * * *